United States Patent

[11] 3,550,989

[72] Inventors Donald H. Hall;
 Erwin J. Nunlist, Rochester, N.Y.
[21] Appl. No. 721,522
[22] Filed Apr. 15, 1968
[45] Patented Dec. 29, 1970
[73] Assignee Sybron Corporation
 Rochester, N.Y.
 a corporation of New York
 Continuation of application Ser. No.
 441,624, Mar. 22, 1965, now abandoned

[54] WEAR RESISTANT ARTICLES AND FACINGS THEREFOR
5 Claims, 2 Drawing Figs.
[52] U.S. Cl. ................................................ 277/96,
 277/88, 277/93
[51] Int. Cl. ................................................... F16j 15/54
[50] Field of Search............................................ 277/38-
 —43, 81, 84—88, 92, 93, 93SD, 96—99, ATD

[56] References Cited
UNITED STATES PATENTS

| | | | |
|---|---|---|---|
| 2,425,209 | 8/1947 | Snyder et al. ................ | 277/96 |
| 2,433,589 | 12/1947 | Adams ......................... | 277/96X |
| 2,447,930 | 8/1948 | Biggs ........................... | 277/96X |

FOREIGN PATENTS

| | | | |
|---|---|---|---|
| 735,250 | 8/1955 | Great Britain................ | 277/96 |

*Primary Examiner*—Laverne D. Geiger
*Assistant Examiner*—Jeffrey S. Mednick
*Attorney*—Theodore B. Roessel ABSTRACT: A corrosion resistant, wear resistant, glass coated seal face is disclosed wherein the glass coating is characterized by having a plurality of randomly scattered, nonconnecting, lubricant receiving voids therein which serve to receive and retain lubricant particles deposited within the voids.

PATENTED DEC 29 1970　　　　　　　　　　　　　　　3,550,989

INVENTORS
DONALD H. HALL
BY　ERWIN J. NUNLIST

Theodore B. Roessel
ATTORNEY

WEAR RESISTANT ARTICLES AND FACINGS THEREFOR

This application is a continuation of Ser. No. 441,624, filed Mar. 22, 1965, now abandoned.

This invention relates to wear resistant articles and facings therefor, as well as a method for producing said facing, and more particularly relates to surfaces suitable for use as seal faces in mechanical seals.

In industries where large amounts of fluid are processed in containers or moved by pumps, it is common to provide devices having rotating shafts that extend into fluid containing vessels. It is often necessary to seal the openings, through which the rotating shafts enter the vessels, to prevent the leakage of fluids, fumes or lubricants. Stuffing boxes or mechanical seals are widely used for this purpose.

Mechanical seals have gained increased acceptance as the preferable device for such uses, as they provide a more effective seal and do not require repeated adjustments. However, mechanical seals include parts that are constantly subjected to sliding friction and eventually wear to a degree that necessitates replacement. Repair or replacement of the seals is a costly and time consuming procedure that often requires a shutdown of the entire process. Therefore, it is desirable to increase the operating life of the components within the mechanical seal.

A mechanical seal, more particularly described hereinafter, comprises a rotating portion, a stationary portion, a spring-loading device and static sealing means that stop leakage between the shaft and the rotating seal ring, which are stationary relative to each other. The rotating portion and the stationary portion have highly finished surfaces that abut each other and are kept in contact by the force exerted by the spring-loading device.

A commonly employed embodiment of a mechanical seal utilizes a stationary seal seat fabricated from a corrosion resistant alloy or ceramic material, and a rotating seal head fabricated from a relatively soft noncorrosive material such as graphite, Teflon, etc. The mating surfaces of the rotating and stationary portions are generally selected of compatible materials to achieve low friction, long wear and corrosion resistance.

In the selection of materials for use in the mating portions of seals, ceramic materials have been quite popular because of their excellent wear resistance properties and corrosion resistance. However, the brittleness and general susceptibility of ceramic materials to thermal shock are major limitations. Historically, many ceramic seal rings are broken both during production and the assembly procedure and others fail in service when the shaft to be sealed hits the ring. The thermal shock properties are poor because of the inherently low heat-conductivity of ceramic materials.

Ceramic coating coatings on metal substrates have been proposed as the ideal solution to the above problems as the ceramic portion should provide corrosion resistance and wear resistance and the metal substrate should provide ease of fabrication, and better heat conductivity. However, ceramic coatings, which may be applied by welding rod or spray techniques have not achieved widespread usage, as homogeneous and dependable coatings are not easily obtained and high wear rates of the mating parts are often encountered. Further, such ceramic materials contain connecting pores that provide a direct passage from the surface to the substrate and, therefore, do not protect the metal substrates from corrosive media.

Glass coatings on a metal substrate would seem to provide an advantageous material. Although the glass separately is relatively brittle and a poor heat conductor, when a thin layer is applied to a metal substrate, the properties of the composite article will substantially approximate those of the metal substrate. Glass coatings are easily applied by well-known enameling techniques and are standard materials for corrosion resistant uses. Although homogeneous glass is generally weaker in tension than solid ceramics, after chipping of a glass coating the metal substrate remains capable of partly performing the function of the total part. In contrast, the failure of a solid ceramic part is often a catastrophic event that may cause an immediate loss of the fluid medium that is being sealed. It is thus apparent that glass-coated metals have inherent advantages that would suggest their suitability for use in mechanical seals. However, glass-coated metals have not been used, because in spite of the excellent corrosion resistance and the minimization of the physical shortcomings by the use of a metal substrate, glass surfaces have not exhibited sufficient wear resistance to justify their use in commercial applications.

It is accordingly the primary object of this invention to provide wear-resistant glasses suitable for use as enamel coatings.

Recently, new partially-crystallized glass-ceramic coating materials have been developed that provide improved physical and mechanical properties such as resistance to thermal shock and impact, corrosion resistance, thermal conductivity, and thermal stability at higher operating temperatures than conventional enameling materials. These properties would indicate that such materials would be well suited for use as facings for the seal seats and heads in mechanical seals. However, our attempts to use partially crystallized glasses as enamels for seal rings were unsuccessful as the rings failed at relative velocities greater than 15 ft. per second. This failure occurred because of the excessive heat that resulted from frictional forces generated by the sliding contact between the seal face and the seal seat.

It is accordingly another object of this invention to provide a seal face material formed from a partially crystallized glass having increased wear properties and capable of minimizing the frictional heat developed at high speeds.

We have found that when a relatively soft surface, such as graphite, is in sliding contact with a harder surface, such as ceramic material, a reduction of friction is effected by the lubricating action of particles worn from the softer surface. This lubricating action occurs where the particles from the softer surface deposit on the harder surface and thus decrease the area of direct contact between the softer and harder surfaces. However, for this deposit to adhere to the harder surface it must have discontinuities on which the softer particles can anchor. In a seal face, a primary requirement is the relative smoothness and flatness of the surface. To achieve the requisite surface properties, the abutting surfaces are commonly precision lapped to within three lightband flatness and four microinches RMS of roughness. It is an object of this invention to provide a surface, characterized by sufficient flatness and smoothness to operate as a seal face, yet having voids on the surface to facilitate the anchoring of particles eroded from a softer surface.

In mechanical seals the abutting sealing surfaces are usually held in contact by preloading. In such cases loss of surface caused by wear is compensated for by the pressure of the springs so that a self-adjusting action is obtained. If the seal face is surface treated to provide the desirable voids, the gradual wearing down of the surface will eventually nullify the effect of the surface treatment. At this point, the rate of wear will sharply increase thus accelerating the time for replacement of the seal. It is thus desirable and an object of this invention to provide a glass or glass-ceramic body so structured that the surface will continuously exhibit discontinuities, notwithstanding the gradual wearing down of the body itself.

In providing a seal face that will constantly exhibit a surface with discontinuities it is important that the structural changes do not adversely affect the outstanding properties of wear resistance and corrosion resistance that are peculiar to the basic materials. It is thus necessary to achieve the above-discussed discontinuities without forming passages from the surface to the substrate. Further, it is of the utmost importance not to increase the susceptibility to thermal shock. It is, therefore, an object of this invention to provide a method for providing said surface discontinuities without adversely affecting the inherent physical properties of the base material.

We have found that the objects of this invention are attained by adding to a basic glass formulation materials that will volatilize during the firing cycle thereof to form a plurality of individual nonconnected bubbles or voids within the final product. The term volatilize as used herein should be construed to include the formation and the entrapment of gases within the glass matrix.

Furthermore, we have found that a superior glass-coated metal composite can be attained by the formation of a plurality of individual bubbles or voids within a semicrystalline glass coating.

A complete understanding of the invention may be obtained from the following description and explanation which refer to the accompanying drawings illustrating the invention.

Figure 1:
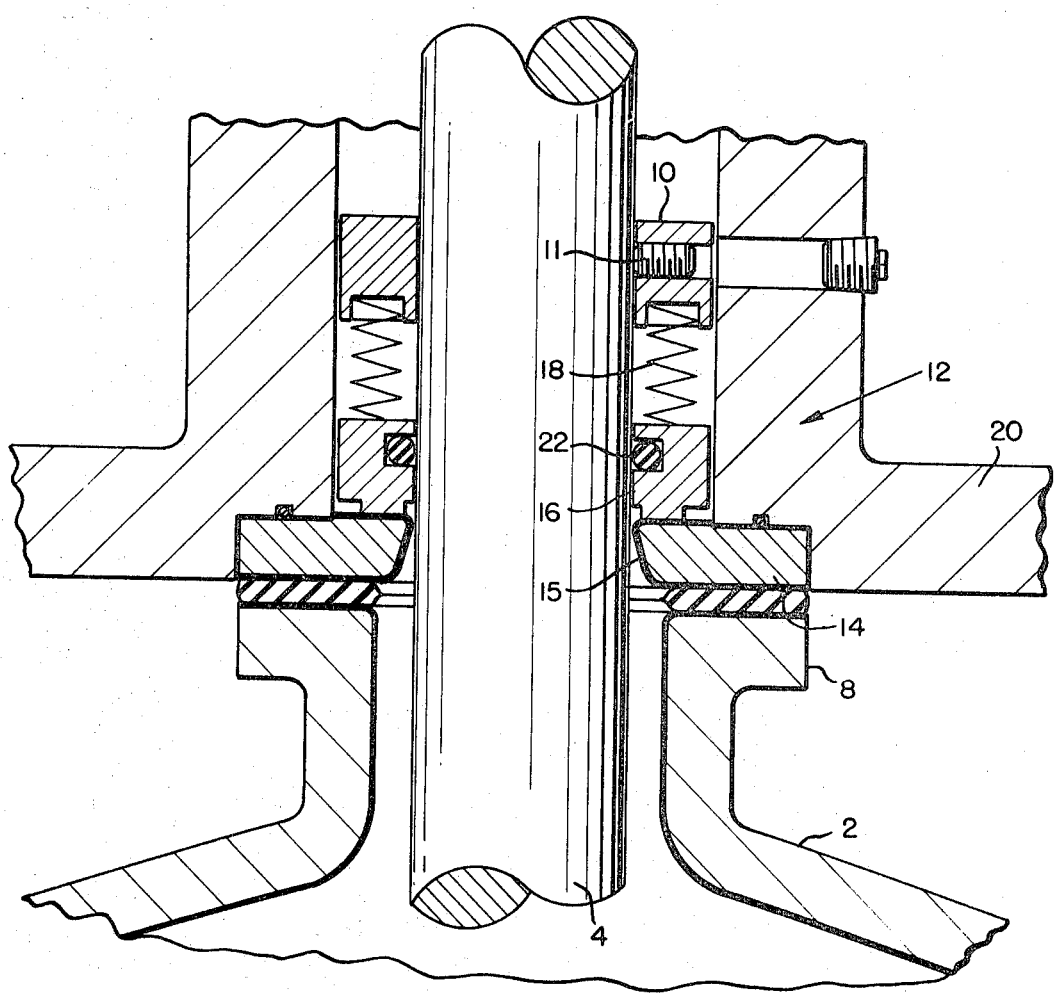
FIG. 1 is a side elevational view partly in section of fluid agitation equipment embodying a mechanical seal.

Referring to FIG. 1, a vessel 2 is provided with an agitator shaft 4 driven by a motor or other driving means (not shown) extending into vessel 2 through a flanged nozzle 8. The shaft 4 terminates in an impeller or mixing means (not shown).

A mechanical seal, generally designated at 12, surrounds the agitator shaft 4 and comprises a stationary seal seat 14, a rotating seal head 16 and spring assembly 18. Rotating seal head 16 has a highly finished surface that abuts a similarly finished surface of stationary seal seat 14. Seal seat 14 has a glass or glass-ceramic coating 15. A spring retaining member 10 is fastened to the rotating shaft by setscrews 11. Stationary seal seat 14 is clamped into position by seal housing 20 and spring assembly 18 through preloading holds seal head 16 into contact with seal seat 14. A static sealing means 22 (O-ring or wedged Teflon member) is provided to seal between shaft 4 and seal head 16, which are substantially static relative to each other.

In operation, sealing between the rotating head 16 and the stationary seat 14 is effected by the intimate contact between the highly finished faces of these components caused by the spring loading of spring assembly 18.

The present invention is specifically directed to providing a glass or glass-ceramic material suitable for use as a face material within the above described structure.

Figure 2:
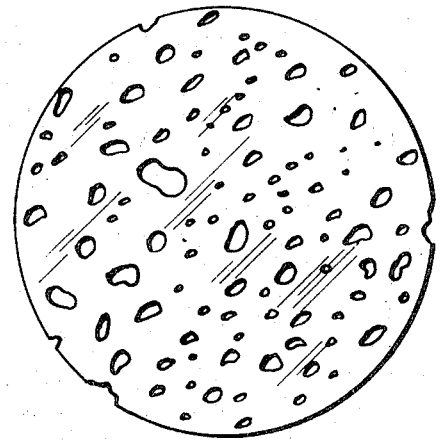
FIG. 2 is an approximately 100×graphic showing of a photomicrograph of a crystallized glass prepared according to the invention.

FIG. 2 shows a glass matrix having a plurality of nonconnecting voids or discontinuities some of which intersect the surface.

The following specific examples will illustrate the manner in which the objects of this invention are obtained.

EXAMPLE I

A glass frit was formed having the following oxide composition:

$SiO_2$—57.3
$TiO_2$—8.8
$Al_2O_3$—9.7
$Na_2O$—6.9
$Li_2O$—9.4
$SrO$—2.8
$Fe_2O_3$—5.1

100 parts of the frit were milled with:

|  | Parts |
| --- | --- |
| Carbonaceous silicate (99% $SiO_2$) | 4.0 |
| Bentonite | 0.4 |
| Enameling clay | 4.0 |
| Potassium chloride | 0.62 |
| Sodium nitrate | 0.21 |
| Silica | 5.0 |
| Water | 45.0 |

The above mixture was sprayed onto a mild steel substrate, fired at 1620° F. and then heat-treated for 1½ hours 0 1440° F.

The resulting product was sectioned and disclosed a partially crystallized glass having a plurality of randomly distributed nonconnecting cavities or voids therein, graphically shown in FIG. 2.

EXAMPLE II 100 parts of the same frit formed in Example I were milled with:
   20 parts $SiO_2$
   8 parts Enameling Clay
   4 parts $Al_2O_3$
   0.4 parts Borax
   0.5 parts $MgCO_3$
   0.25 parts $NaNO_2$
   1.5 parts LiF
   61 parts $H_2O$ The above mixture was sprayed onto a metal substrate, fired at 1620° F. and heat-treated for 1½ hours 0 1440° F.

The product was sectioned and a photomicrograph of the resulting product revealed a product similar to that of Example I.

EXAMPLE III

The glass composition of Example I was applied to the face of a seal ring within a mechanical seal according to the invention. A glass composition, the same in all respects except for the absence of volatile compounds was applied to another seal ring. The ring coated according to the invention was still performing satisfactorily after 6 months of continual use. The ring prepared according to conventional techniques failed after 4 hours.

Although we have described the subject of this invention in terms of its utility as a seal face, it is not limited thereto and is useful in many other applications where wear resistance is necessary. For example, in the textile industry, where fibers are passed at high speeds over various parts, a glass composition with an organic flocculating agent added in accordance with our invention, increased the useful life of a part from 3 days to 3 months, and even longer in some cases.

To obtain the desired discontinuities within the coating, it is necessary to add materials that volatilize during the firing, yet do not adversely affect the crystallization of the glass, such as by inhibiting crystallization or causing premature crystallization. Further, the bubbles formed must not coalesce and grow during heat treatments to form connecting pinholes in the coating which communicate with the base. Lastly, the materials should not be of a type that may "spoil" after aging several days or weeks in the milled slip.

We have found that carbonaceous silicate materials are suitable for use in forming the discontinuities that are the object of this invention. However, numerous available organic and inorganic materials such as clays, lithium fluorides, and organics may be useful for this purpose. In fact, any material that will volatilize during the maturing of the coatings and that does not inhibit crystallization, form crystals, act as a nucleating agent or reduce corrosion resistance would be suitable.

To achieve the object of the invention it is necessary for the bubble-forming material to volatilize, yet remain entrapped within the matrix of the glass. Accordingly, volatilization must occur while the glass is sufficiently viscous to overcome the pressures exerted by the volatilizing gases thereby preventing their escape and favoring the formation of bubbles. The softening point of the glass defines the lower limit at which the glass viscosity will favor the entrapment of bubbles. The upper limit is not definite but may be broadly characterized as the temperature at which the glass would become sufficiently fluid to permit the escape of the volatile materials. The range of temperatures defined by the softening point and this extremely fluid condition is generally 1000° F. to 1700° F.

Numerous have been tried or used as seal faces in mechanical seals. Porous materials, such as sintered brass and powdered metals are suitable for some applications, however, such materials lack the corrosion resistance necessary for many other applications. Solid ceramic bodies offer better corrosion resistance than metals, but are relatively fragile and expensive. Satisfactory ceramic coated metals are not readily available because of the difficulties inherent in attempting to provide a bond between the ceramic and the metal sufficiently strong to withstand the forces generated in use. Glass-coated metals have heretofore provided the necessary corrosion resistance, but prior to the present invention have not been suitable because of the wear rate of the surface.

The major advantage of this invention is the provision of glass coatings having in combination all the advantages of the prior glass and glass-ceramic coated materials and, in addition, having heretofore unavailable wear resistance.

Although the surface characteristics necessary to provide increased wear resistance may be achieved by a surface treatment such as etching or sandblasting, the preferred method is the formation of discontinuities throughout the face material.

This has the additional advantage of providing a wear resistant surface during the entire life of the face material.

The term glass as used herein should be construed as including both amorphous and crystallized, or semicrystalline glasses.

To assure good adhesion between various base metals and glass coatings, an expedient well-known in the art is the application of a ground coat enamel upon the surface of the metal. Ground coats are specially formulated to enhance uniform coating over the base metal and to form a strong bond between the surface or cover coat and the base metal. After the aforesaid ground coat has been applied one or more cover coats are applied thereover. These cover coats are formulated to provide the surface characteristics required for the particular application. The use of ground coats and cover coats, both amorphous and semicrystalline, is within the scope of this invention.

Although we have disclosed specific methods, compositions and mill additions effective for the practice of our invention, it should be understood that the invention does not reside chiefly in the compositions or amounts of volatile materials involved, but in the recognition that a substantially improved wear resistant material can be obtained by providing a surface having noncontinuous voids or cavities intersecting said surface; and providing said voids without destroying the advantageous properties of the glass or glass-ceramic matrix.

Accordingly, the specific examples and materials are illustrative, rather than limiting, and those skilled in the art, in the light of this disclosure will be able to determine the specific parameters and materials that will most effectively suit their requirements without departing from the spirit and scope of the invention as set forth in the appended claims.

We claim:
1. A rotating shaft seal assembly comprising:
    a. a rotating seal member surrounding the shaft;
    b. sealing means between said rotating shaft and member;
    c. a stationary seal member having a seat in sliding, fluid tight contact with said rotating seal member;
    d. bias means for urging said rotating seal member in fluid tight contact with said stationary seal seat;
    e. one of said seal members having a coating of glass formed thereon, said coating formed with a plurality of randomly scattered, nonconnecting, bubbles, a portion of said bubbles being wholly contained within said coating and said coating having a ground planar wearing surface formed thereon to expose a portion of said bubbles, said exposed bubbles providing lubricant receiving voids in said coating; and
    f. the other of said seal members being formed of a softer material than the planar surface of said glass coated seal face said softer material serving to wear off in particles and deposit in said voids while in sliding, fluid tight contact with said glass-coated seal, thereby lubricating and increasing life of the seal assembly and the glass coated seal face gradually wearing in service to expose additional bubbles.

2. The seal assembly as defined in claim 1, wherein said coating of glass is formed on said stationary seal member.

3. The seal assembly as defined in claim 2, wherein said glass coating is formed from a crystallizable glass.

4. The seal assembly as defined in claim 3, wherein said rotating seal member is formed of graphite.

5. The seal assembly as defined in claim 1, wherein said coating of glass comprises an impervious ground coat and a pervious cover coat.